US012137151B2

United States Patent
Niwa

(10) Patent No.: US 12,137,151 B2
(45) Date of Patent: Nov. 5, 2024

(54) DEVICE MANAGEMENT SYSTEM, INFORMATION PROCESSING DEVICE, DEVICE, DEVICE MANAGEMENT METHOD, AND MEDIUM

(71) Applicant: Canon Kabushiki Kaisha, Tokyo (JP)

(72) Inventor: Koji Niwa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/060,091

(22) Filed: Nov. 30, 2022

(65) Prior Publication Data
US 2023/0188615 A1 Jun. 15, 2023

(30) Foreign Application Priority Data
Dec. 9, 2021 (JP) .................................. 2021-200394

(51) Int. Cl.
*H04L 67/51* (2022.01)
*H04L 9/40* (2022.01)

(52) U.S. Cl.
CPC ............ *H04L 67/51* (2022.05); *H04L 63/101* (2013.01)

(58) Field of Classification Search
CPC ..... H04L 67/01; H04L 69/329; H04L 63/102; H04L 63/10; H04L 63/20; H04L 63/08; H04L 67/02; H04L 67/10; H04L 63/101; H04L 67/51
See application file for complete search history.

(56) References Cited

U.S. PATENT DOCUMENTS

| | | | |
|---|---|---|---|
| 6,789,194 B1 * | 9/2004 | Lapstun ............... | B41J 2/17513 713/176 |
| 8,271,804 B2 * | 9/2012 | Kudo .................... | H04L 9/3236 380/278 |
| 10,091,278 B1 * | 10/2018 | Garlapati ................ | H04W 4/70 |
| 10,178,159 B2 * | 1/2019 | Prashant ............. | H04L 63/0876 |
| 2003/0046535 A1 * | 3/2003 | Nelson .................. | H04L 63/08 713/155 |
| 2003/0099353 A1 * | 5/2003 | Goh ...................... | G06Q 20/389 380/51 |
| 2003/0182475 A1 * | 9/2003 | Gimenez ................ | G06F 21/10 710/8 |

(Continued)

FOREIGN PATENT DOCUMENTS

CN 111845143 A * 10/2020 ............ B41J 29/393
JP 2017129897 A 7/2017

*Primary Examiner* — Ninos Donabed
(74) *Attorney, Agent, or Firm* — Venable LLP

(57) ABSTRACT

A device management system comprises a device management service to perform device management; and a device to be managed. The device transmits a registration request to the device management service. The device management service determines, in response to the registration request, whether the device is a device to be registered as a shared device. If the device management service determines that the device is not a device to be registered as the shared device, the device management service transmits, to the device, a notification that the device can be registered as a private device. The device transmits, in response to the notification, a private device registration request along with user authentication information to the device management service. The device management service registers the device in association with a user identified by the user authentication information.

6 Claims, 12 Drawing Sheets

(56) References Cited

U.S. PATENT DOCUMENTS

| | | | |
|---|---|---|---|
| 2005/0163549 A1* | 7/2005 | Shima | G06F 21/608 400/62 |
| 2006/0195495 A1* | 8/2006 | Asano | H04L 67/125 708/111 |
| 2008/0037050 A1* | 2/2008 | Sasaki | G06F 13/102 358/1.15 |
| 2011/0145150 A1* | 6/2011 | Onischuk | G06Q 30/08 705/50 |
| 2011/0235085 A1* | 9/2011 | Jazayeri | G06F 3/1238 358/1.14 |
| 2013/0046698 A1* | 2/2013 | Gagerman | G06Q 20/042 705/71 |
| 2013/0094044 A1* | 4/2013 | Harada | G06F 3/1285 358/1.13 |
| 2013/0268687 A1* | 10/2013 | Schrecker | H04W 12/06 709/229 |
| 2013/0268758 A1* | 10/2013 | Schrecker | H04W 12/069 713/168 |
| 2013/0268766 A1* | 10/2013 | Schrecker | G06F 21/34 713/185 |
| 2013/0268767 A1* | 10/2013 | Schrecker | G06F 21/31 713/185 |
| 2014/0340717 A1* | 11/2014 | Meiyappan | H04N 1/32518 358/400 |
| 2016/0182350 A1* | 6/2016 | Davis | H04L 41/122 709/206 |
| 2016/0253128 A1* | 9/2016 | Mori | G06F 3/1298 358/1.15 |
| 2016/0269376 A1* | 9/2016 | Goyal | H04L 63/04 |
| 2016/0292659 A1* | 10/2016 | Noonan | G06Q 20/3223 |
| 2017/0085730 A1* | 3/2017 | Maeda | H04N 1/4413 |
| 2017/0230540 A1* | 8/2017 | Sasaki | G06F 21/44 |
| 2017/0279889 A1* | 9/2017 | Boss | G06F 3/067 |
| 2018/0307813 A1* | 10/2018 | Praden | G06F 21/121 |
| 2018/0314657 A1* | 11/2018 | Chen | G06F 13/4282 |
| 2018/0341759 A1* | 11/2018 | Sato | G06F 21/608 |
| 2019/0034621 A1* | 1/2019 | Mondello | H04L 63/18 |
| 2019/0158702 A1* | 5/2019 | Shirakawa | H04N 1/00384 |
| 2019/0196761 A1* | 6/2019 | Minakawa | G06F 3/1238 |
| 2019/0306331 A1* | 10/2019 | Oguchi | G06F 3/1291 |
| 2019/0361643 A1* | 11/2019 | Tsuji | H04N 1/00244 |
| 2020/0027080 A1* | 1/2020 | Holland | G06Q 20/36 |
| 2020/0037156 A1* | 1/2020 | Najmi | H04W 12/041 |
| 2020/0356329 A1* | 11/2020 | Morita | G06F 3/1268 |
| 2021/0240418 A1* | 8/2021 | Saito | G06F 3/1203 |
| 2022/0198523 A1* | 6/2022 | Jeong | G06Q 30/0267 |
| 2023/0188615 A1* | 6/2023 | Niwa | H04L 63/0876 709/203 |

* cited by examiner

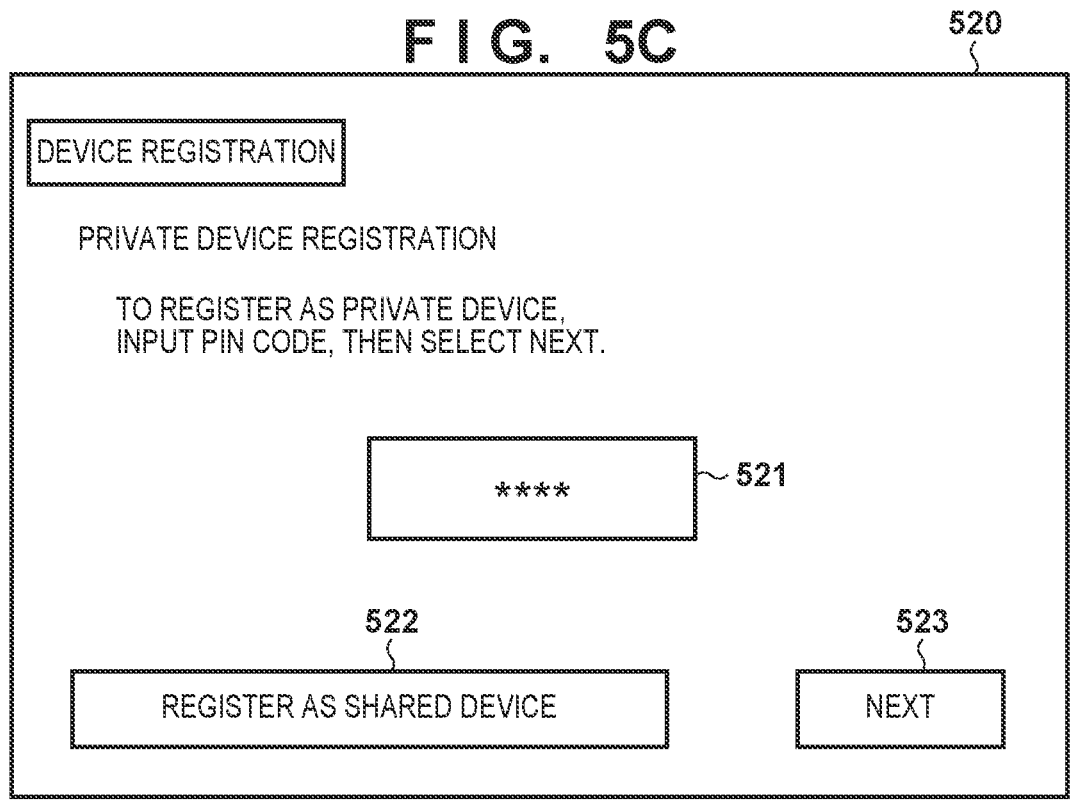

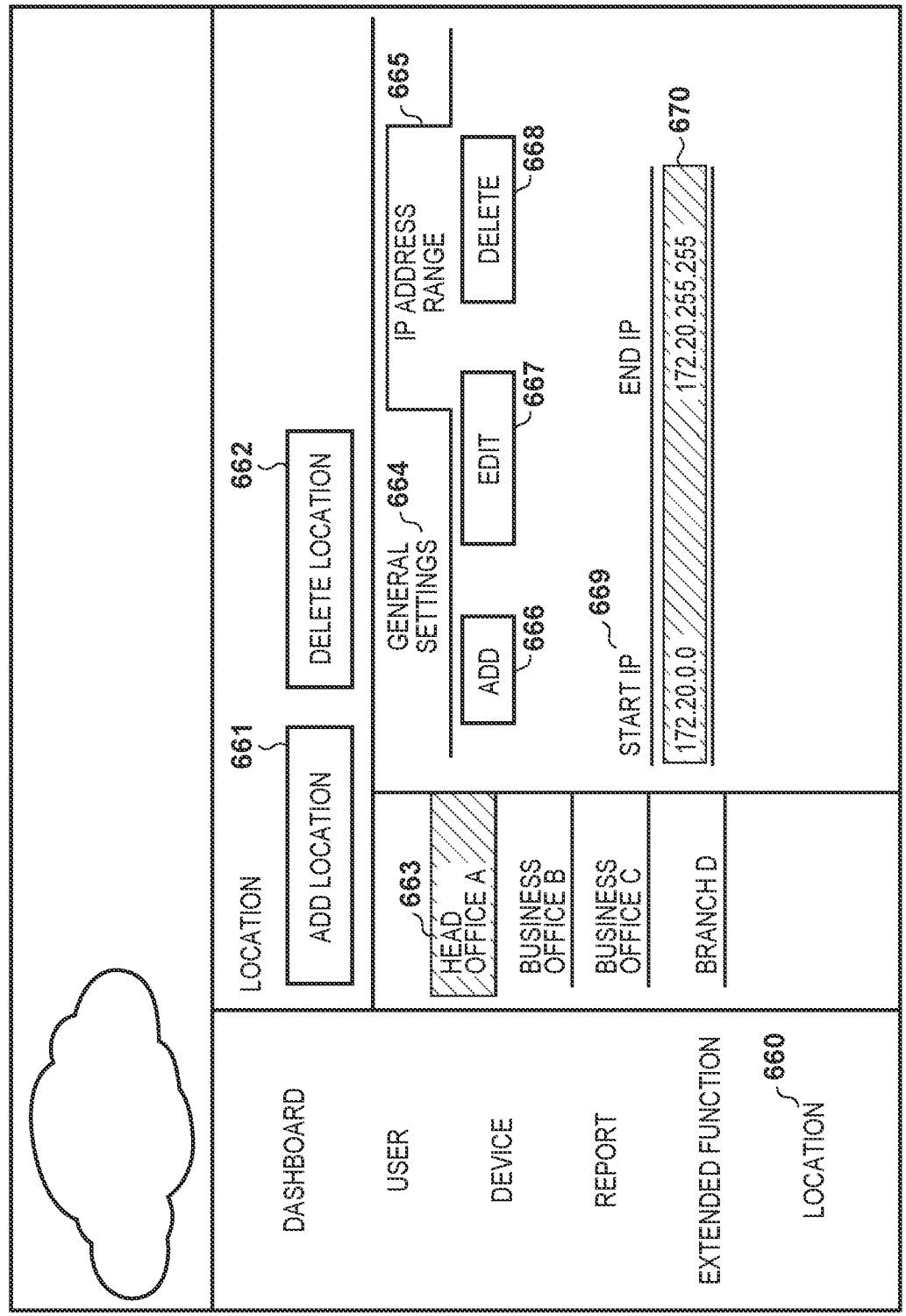

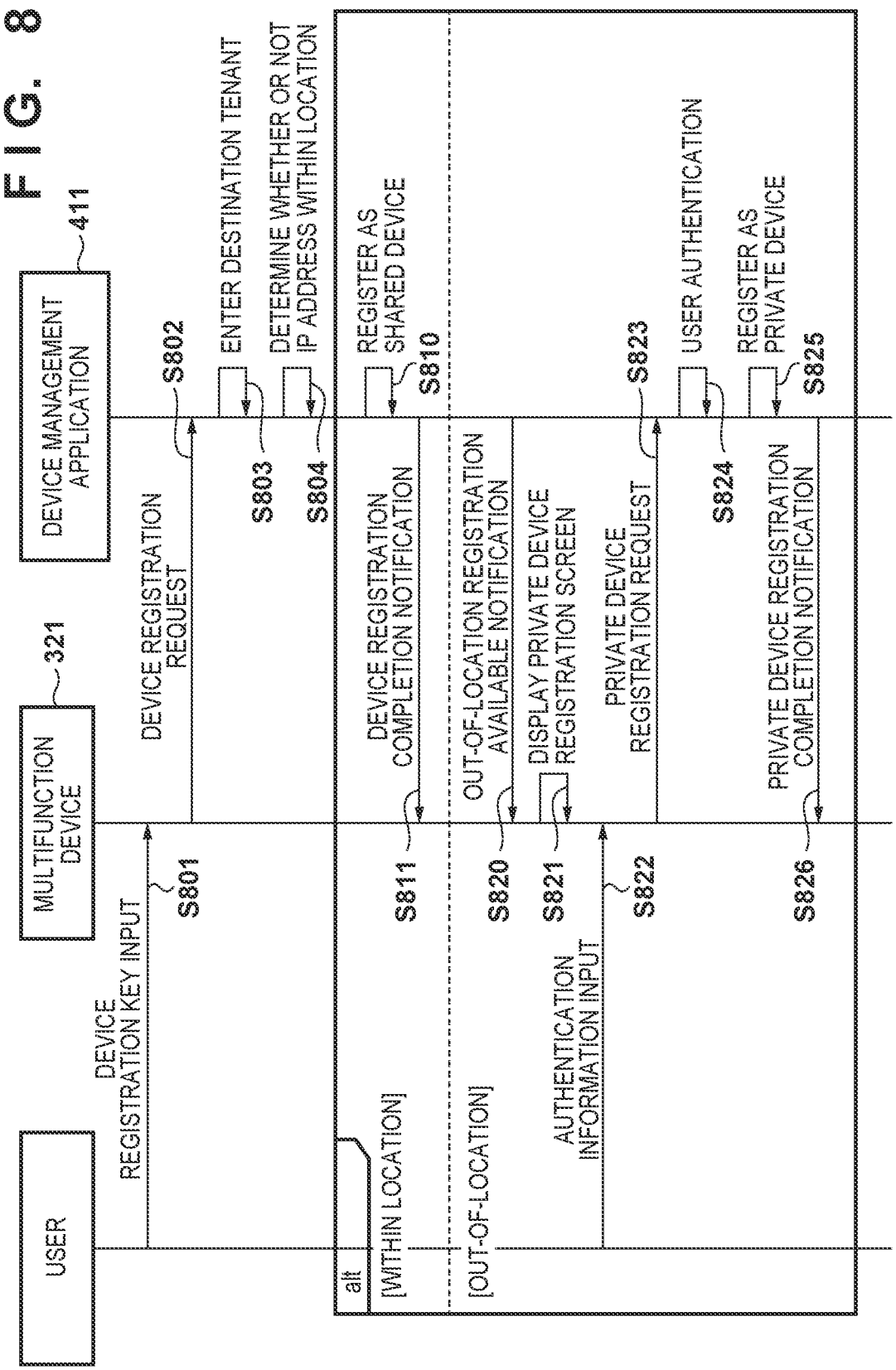

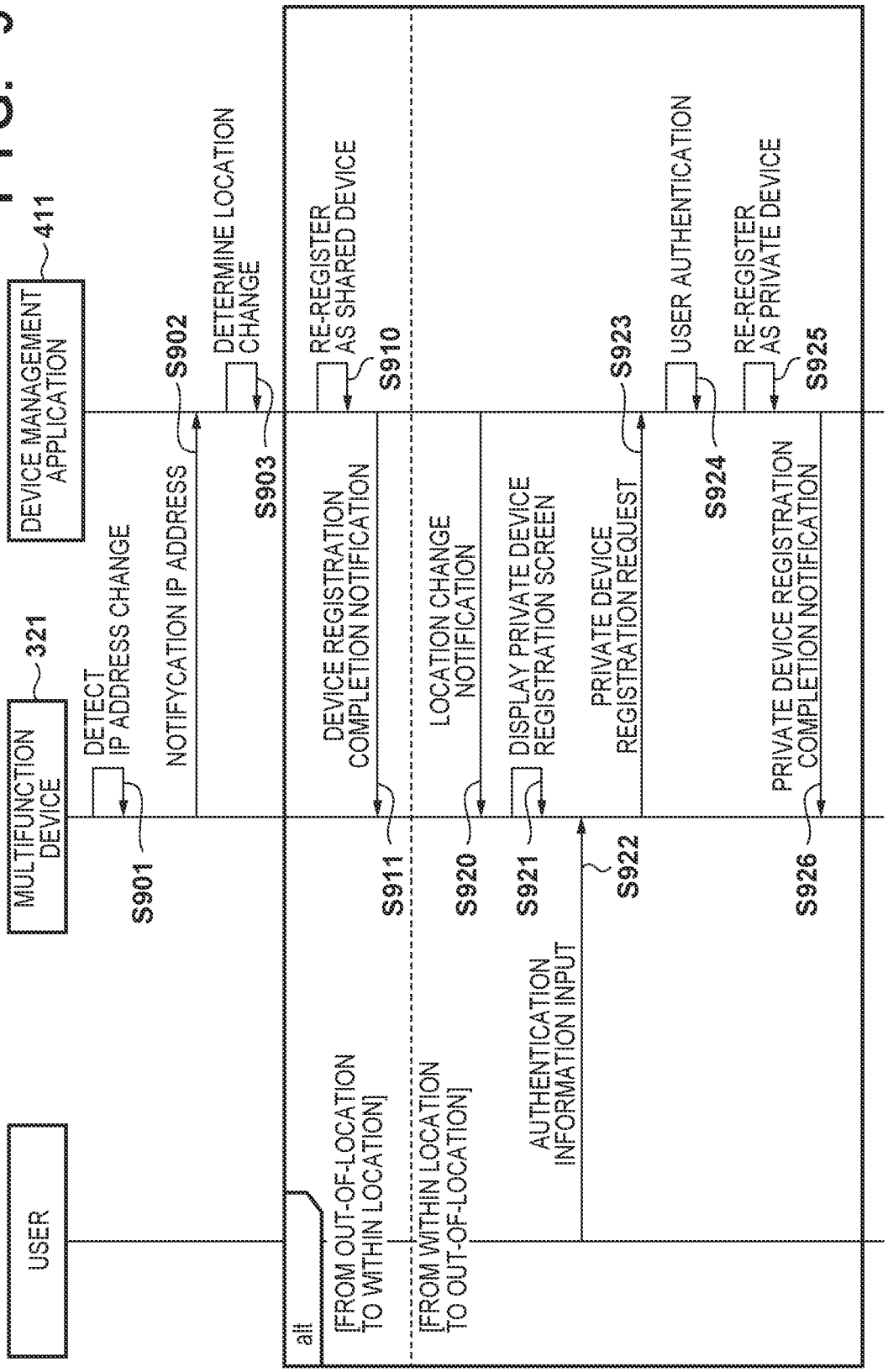

DEVICE MANAGEMENT SYSTEM, INFORMATION PROCESSING DEVICE, DEVICE, DEVICE MANAGEMENT METHOD, AND MEDIUM

BACKGROUND OF THE INVENTION

Field of the Invention

The present invention relates to a device management system, an information processing device, a device, device management method, and a medium, particularly to registration of a device with a cloud service.

Description of the Related Art

With the spread of cloud platform, systems in which services provided on the cloud side and devices operate in cooperation with each other are becoming commonplace. In addition, a form of usage in which a company or a part of its organizational unit collectively manages a plurality of these devices on the cloud is becoming popular. This management unit is generally called a tenant. In the tenant, by registering devices existing in a corporate office, it is possible to centrally manage the devices in the office. Furthermore, it is possible to centrally manage user information, extended applications running on the devices, and various usage statuses.

As an example of the management system, image forming devices such as a plurality of printers and digital multifunction devices in the corporate office are managed in a tenant. In this management system, a user can log in to a device using user authentication information authenticated by the same user authentication method managed by the tenant, and use various functions such as scanning and printing of the image forming devices. Further, any device managed by the tenant can perform the same workflow via the extended application. Furthermore, their usage histories are recorded, and a tenant administrator can grasp usage statuses of users and image forming devices.

In device management of the management system as described above, there are cases where the devices are managed in use units such as organizations or customers, for example, in units of locations or groups such as offices, buildings, departments, and even rooms. For example, Japanese Patent Laid-Open No. 2017-129897 discloses a technique for identifying a group to which a terminal device belongs from information that uniquely identifies a terminal device connected to a network, such as an IP address of a device.

On the other hand, in recent years, as one form of work, there is a trend toward an increase in telework in which work is done at home, and multifunction devices are being used in various ways. It is assumed that in addition to shared use of the multifunction device by a plurality of users in the office, the multifunction device is installed at a telecommuting location (for example, an employee's private home) for telework and used exclusively by a specific user. Therefore, in a system that manages the devices, a shared device may be managed by associating it with a tenant, and a private device used exclusively by the specific user may be managed by associating it with the user. Thus, when the user uses a printing function from an information processing device such as a personal computer (PC), it is possible to contribute to improving convenience by presenting a private device associated with the user as an output destination.

In the related art, the above-described group identification method is based on a premise that IP addresses in the network are managed for each use unit such as an organization or a customer. However, a network of a private home is a separate network from a network of the organization, the customer, or the like, and an IP address to be used depends on setting of a network device (router or the like) of the private home. By the IP address of the device, it is possible to distinguish between a shared device within a network managed by the management system and a private device outside the network. However, there is a problem that it is not considered which user the private device is associated with.

SUMMARY OF THE INVENTION

The present invention provides management of devices and their users in a simple manner that reduces the effort of users and administrators.

The present invention has the following configurations. According to one aspect of the present invention, there is provided a device management system comprising: a device management service configured to perform device management; and a device to be managed, wherein the device transmits a registration request along with device registration information to the device management service, the device management service determines, in response to the registration request, whether the device is a device to be registered as a shared device, based on the device registration information, in a case where the device management service determines that the device is not a device to be registered as the shared device, the device management service transmits, to the device, a notification that the device can be registered as a private device, the device transmits, in response to the notification that the device can be registered as the private device, a private device registration request along with user authentication information to the device management service, and the device management service registers, in response to the private device registration request, the device in association with a user identified by the user authentication information.

According to another aspect of the present invention, there is provided a device management system comprising: a device management service configured to perform device management; and a device to be managed, wherein the device management service determines, in response to receiving a changed address from a registered device, whether the device is a device to be registered as a shared device, in a case where the device management service determines that the device is not a device to be registered as the shared device, the device management service transmits, to the device, a notification that the device is to be registered as a private device, the device transmits, in response to the notification that the device is to be registered as the private device, a private device registration request along with user authentication information to the device management service, and the device management service re-registers, in response to the private device registration request, the device in association with a user identified by the user authentication information.

According to still another aspect of the present invention, there is provided an information processing device that manages a device to be managed, the information processing device comprising: one or more processors; and one or more memory comprising one or more programs, wherein the one or more programs are configured to cause the one or more processors to perform: determining, in response to a registration request transmitted along with device registration information from the device, whether the device is a device to be registered as a shared device, based on the device registration information; and transmitting, in a case where it is determined that the device is not a device to be registered as the shared device, to the device a notification that the device can be registered as a private device, wherein in response to a private device registration request transmitted with user authentication information from the device, the device is registered in association with a user identified by the user authentication information.

According to yet another aspect of the present invention, there is provided a device to be managed by a device management service, the device comprising: one or more processors; and one or more memory comprising one or more programs, wherein the one or more programs are configured to cause the one or more processors to perform: transmitting a registration request along with device registration information to the device management service; and transmitting, in response to a notification that the device can be registered as a private device, a private device registration request along with user authentication information input by a user via a user interface, to the device management service, the notification being transmitted in a case where the device management service determines, in response to the registration request, that the device is not a device to be registered as a shared device.

According to still another aspect of the present invention, there is provided a device management method performed by a device management system including a device management service configured to perform device management and a device to be managed, the device management method comprising: the device transmitting a registration request along with device registration information to the device management service; the device management service determining, in response to the registration request, whether the device is a device to be registered as a shared device, based on the device registration information; the device management service transmitting, in a case where the device management service determines that the device is not a device to be registered as the shared device, to the device a notification that the device can be registered as a private device; the device transmitting, in response to the notification that the device can be registered as the private device, a private device registration request along with user authentication information to the device management service; and the device management service registering, in response to the private device registration request, the device in association with a user identified by the user authentication information.

According to yet another aspect of the present invention, there is provided a device management method performed by a device management system including a device management service configured to perform device management and a device to be managed, the device management method comprising: the device management service determining, in response to receiving a changed address from a registered device, whether the device is a device to be registered as a shared device; the device management service transmitting, in a case where the device management service determines that the device is not a device to be registered as the shared device, to the device a notification that the device is to be registered as a private device; the device transmitting, in response to the notification that the device is to be registered as the private device, a private device registration request along with user authentication information to the device management service; and the device management service re-registering, in response to the private device registration request, the device in association with a user identified by the user authentication information.

According to the present invention, the management of devices and their users can be provided in a simple manner that reduces the effort of users and administrators.

Further features of the present invention will become apparent from the following description of exemplary embodiments with reference to the attached drawings.

BRIEF DESCRIPTION OF THE DRAWINGS

FIG. 5C is a diagram illustrating an example of the screen displayed on the operation unit by the application of the multifunction device.

FIG. 6D is a diagram illustrating an example of the screen displayed on the browser by the configuration application of the cloud server.

FIG. 8 is a sequence diagram illustrating an example of a device registration procedure.

FIG. 9 is a sequence diagram illustrating an example of a device information update procedure in another embodiment.

DESCRIPTION OF THE EMBODIMENTS

Figure 1:
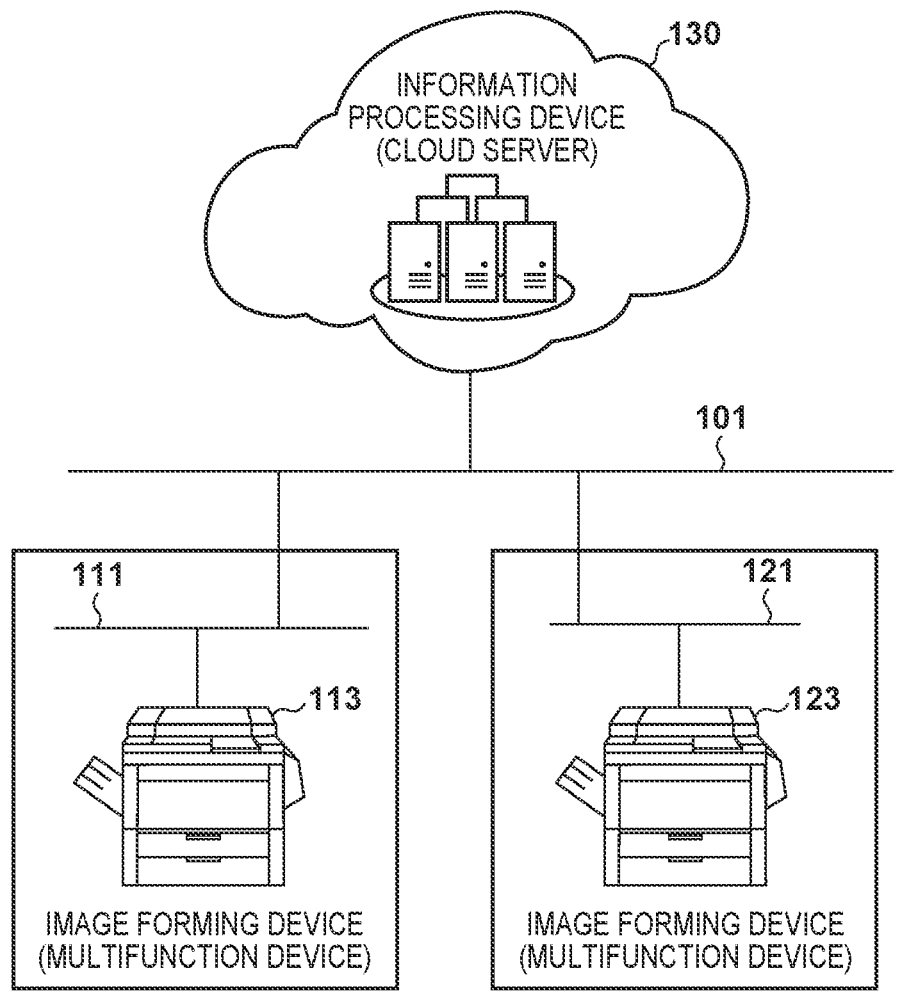
FIG. 1 is a diagram illustrating a network configuration of a device management system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Network Configuration of Device Management System

FIG. 1 is a diagram illustrating a network configuration to which a multifunction device that is an image forming device and a cloud server that is an information processing device according to an embodiment of the present invention can be applied. In FIG. 1, networks 101, 111, and 121 are networks supporting, for example, TCP/IP. Multifunction devices 113 and 123 are respectively connected to the networks 111 and 121. Then, the networks 111 and 121 and a cloud server 130 are connected to the network 101. The networks 101, 111, and 121 are connected to each other via routers and other peripheral devices (not illustrated).

The multifunction device 113 is an example of an image processing device, and has a printing function, a scanner function, a file transmission function, a facsimile function, a copy function, and the like. The multifunction device 123 also has the same functions, and the number of multifunction devices is not limited to two.

The cloud server 130 centrally manages user authentication information, a shared multifunction device associated with a tenant (hereinafter referred to as a shared device), a multifunction device associated with a user (hereinafter referred to as a private device), and the like. Further, the cloud server 130 has a function of receiving a device registration request from an application operating on the multifunction device 113 or the like and registering the multifunction device 113 or the like on a cloud service. The tenant is a management unit for management by a cloud, and for example, if the user, the device, or the like is to be managed, it is managed in units of users, devices, or tenants.

The above configurations describe general configurations to make the description easier to understand. In addition to these configurations, the information processing device such as a personal computer (hereinafter referred to as a PC) used by the user to access information on the cloud service may be connected to the network 111 and 121.

Schematic Configuration of Multifunction Devices 113 and 123

Figure 2:
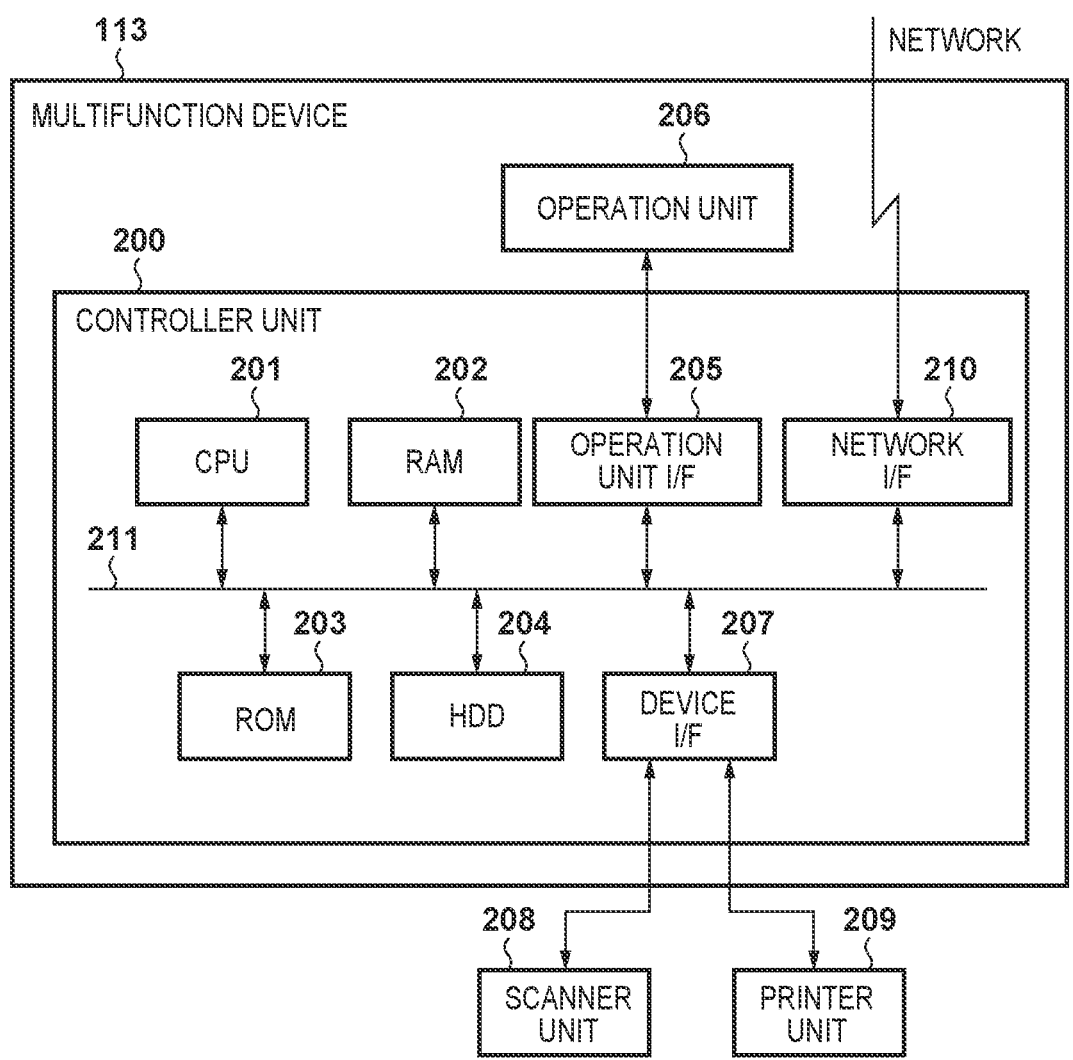
FIG. 2 is a block diagram illustrating a schematic configuration of a multifunction device.

FIG. 2 is a block diagram illustrating a schematic configuration of the multifunction devices 113 and 123 according to the embodiment of the present invention. FIG. 2 is illustrated as the multifunction device 113 to simplify the description. In FIG. 2, the multifunction device 113 has a controller unit 200, an operation unit 206, a scanner unit 208, and a printer unit 209.

The controller unit 200 is a device that controls the multifunction device. The controller unit 200 includes a CPU 201, a RAM 202, a ROM 203, an HDD 204, an operation unit I/F 205, a device I/F 207, and a network I/F 210, which are connected to each other by a system bus 211.

The CPU 201 comprehensively controls each device connected to the system bus 211 and controls the entire image forming device 113. The RAM 202 stores programs and data such as an operating system, system software, and application software. The ROM 203 stores a system boot program, a system program, and an application program. Further, information necessary for the image forming device, such as fonts, may be stored. The HDD 204 is a hard disk drive and stores the operating system, system software, application software, image data, configuration data, print jobs, and the like. The programs stored in the RAM 202 are executed by the CPU 201 to process the image data and data other than images stored in the RAM 202, ROM 203, and HDD 204. Further, in a compact multifunction device, there is a configuration in which the system software, the application software, and the like are stored in the ROM 203 without the HDD 204 being installed. Alternatively, instead of the HDD 204, there may be a configuration using a storage device other than a hard disk, such as a flash memory such as a solid state disk (SSD).

The operation unit I/F 205 is an interface unit with the operation unit 206 having a touch panel, and outputs the image data to be displayed on the operation unit 206 to the operation unit 206. Further, the operation unit I/F 205 informs the CPU 201 of information input by the user from the operation unit 206.

The device I/F 207 connects the scanner unit 208 and printer unit 209, which are image input and output devices, to the controller unit 200, and inputs and outputs the image data. The image data input from the scanner unit 208 via the device I/F 207 is stored in the RAM 202 and HDD 204. The stored image data is subjected to image processing or the like by an application program stored in the RAM 202 as necessary. Further, the image data is output to the printer unit 209 via the device I/F 207. The network I/F 210 connects to a network and inputs and outputs image data of an external device on the network or information for controlling a multifunction device.

It goes without saying that even a configuration not illustrated in FIG. 2 is not limited to a configuration of FIG. 2 as long as effects of the present invention can be obtained. For example, a printer without the scanner unit 208 may be used. Further, in a case of a multifunction device having a FAX function, the controller unit 200 may be provided with an I/F for a modem device (not illustrated in FIG. 2), and may be connected to a public line via a modem to allow FAX transmission. Alternatively, the controller unit 200 may be provided with a USB I/F in order to read data stored in an ID card or the like to allow user authentication.

Software Configuration of Multifunction Devices 113 and 123

Figure 3:
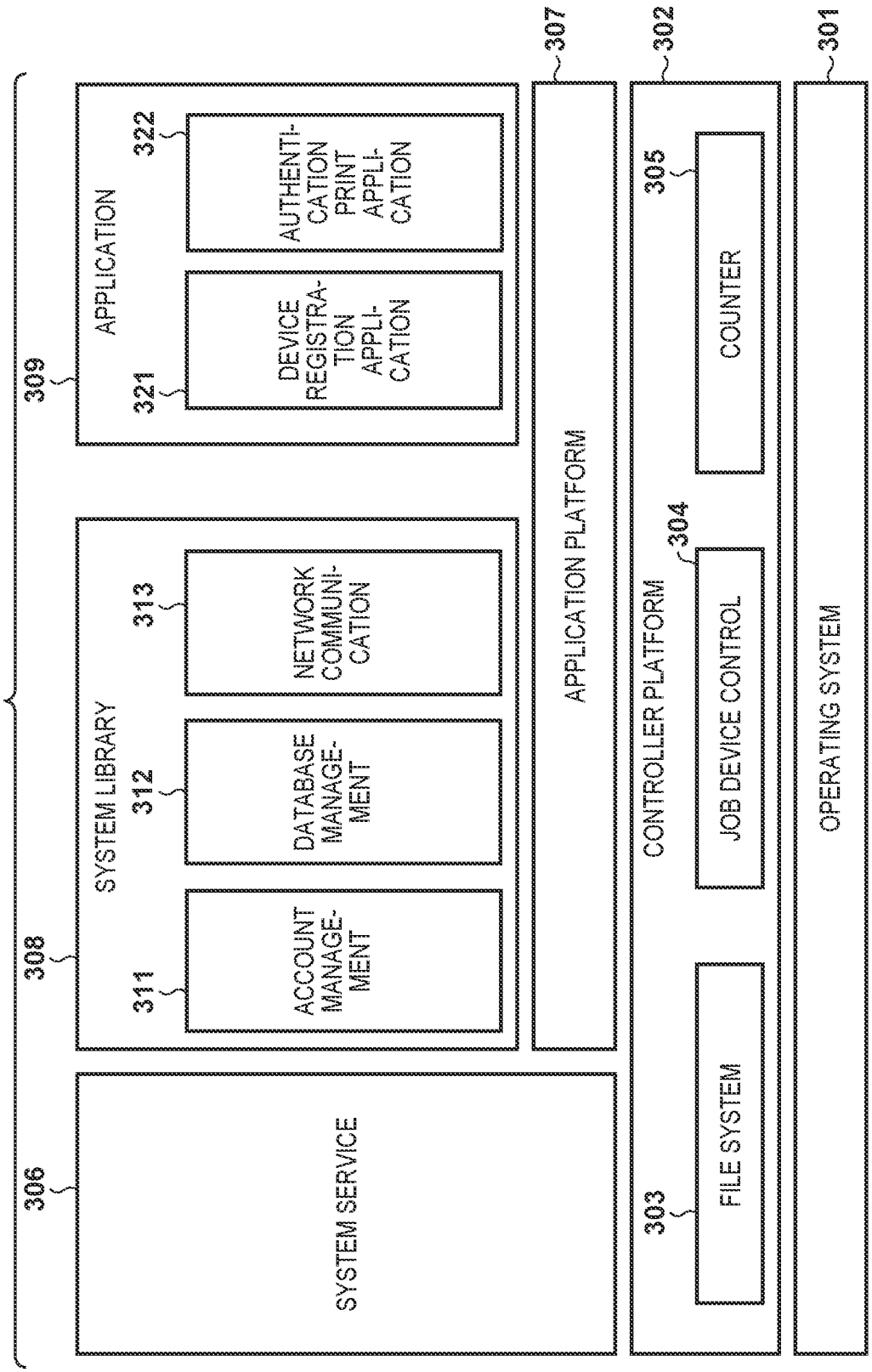
FIG. 3 is a block diagram illustrating a software configuration of the multifunction device.

FIG. 3 is a block diagram illustrating a software configuration of the multifunction devices 113 and 123 according to the embodiment of the present invention, which is implemented in the controller unit 200. Software built into the multifunction device and processed by the controller unit 200 is implemented as so-called firmware and executed by the CPU 201. In FIG. 3, the multifunction device 113 is described for the sake of simplicity.

An operating system 301 provides various resource management services and frameworks optimized for embedded system control for the software running on the operating system. The various resource management services and frameworks provided by the operating system 301 include multitask management in which multiple processes are substantially operated in parallel by managing multiple execution contexts of processes by the CPU 201. Further, there is inter-task communication that performs synchronization and data exchange between tasks. Furthermore, the operating system 301 also provides memory management, interrupt management, various device drivers, a protocol stack that implements various protocol processes such as a local interface, a network, and communication, and the like.

A controller platform 302 includes a file system 303, a job/device control 304, and a counter 305. The file system 303 is a mechanism for storing data constructed on the storage device such as the HDD 204 and the RAM 202, and is used to spool a job handled by the controller unit 200 and save various data. The job/device control 304 controls hardware of the multifunction device, and controls a job that mainly use basic functions (printing, communication, image conversion, and the like) provided by the hardware. The counter 305 manages an expiration date for each application and a counter value based on print usage records.

A system service 306 is a module for monitoring an operating status of the multifunction device and downloading software and licenses from a software distribution server via the network.

An application platform 307 is middleware for making mechanisms of the operating system 301 and the controller platform 302 available from a system library 308 and applications 309, which will be described later.

The system library 308 is a software module that functions to provide a service available from the application 309, and includes account management 311, database management 312 and network communication 313.

The application 309 is a software module that can display a menu on the operation unit 206 and receive an input from the user and provides various functions provided by the printer to the user.

A device registration application 321 is one of the applications 309, and uses the network communication 313 to communicate with a device management application 411 of the cloud server 130 which will be described later. The device registration application 321 transmits device registration information including a device registration key input via the operation unit 206 and an IP address of the multifunction device 113 to the device management application 411. By doing so, it provides a function for registering the multifunction device 113 with the cloud service, particularly with the device management application 411. The device registration key is information provided by the cloud server 130, and includes information such as information for identifying a tenant which is a device management unit. Note that the device management application 411 is an application for providing a service to a client and is also referred to as a device management service 411. On the other hand, the device registration application 321 is a function of the client that is a device managed by the device management service 411, and is also referred to as a device management client 321.

An authentication print application 322 is one of the applications 309, and uses the network communication 313 to communicate with an authentication application 410 of the cloud server 130 which will be described later and performs user authentication. The authentication print application 322 communicates with the authentication application 410 to verify a user name and password input via the operation unit 206 to authenticate the user. Note that user authentication may be performed using a PIN code associated with the user instead of the user name and password. Further, user information recorded on the ID card may be input by providing the multifunction device 113 with a magnetic card or IC card reading device or a bar code or two-dimensional bar code reading function. When user authentication succeeds, print job information associated with the user acquired from a print management application 414 is acquired. Then, the authentication print application 322 provides a remote printing function for printing based on the acquired print job information. Further, the authentication print application 322 may have a function of transmitting usage statistical information including the number of prints of the executed print job or the like to the cloud server 130.

Software Configuration of Cloud Server 130

Figure 4:
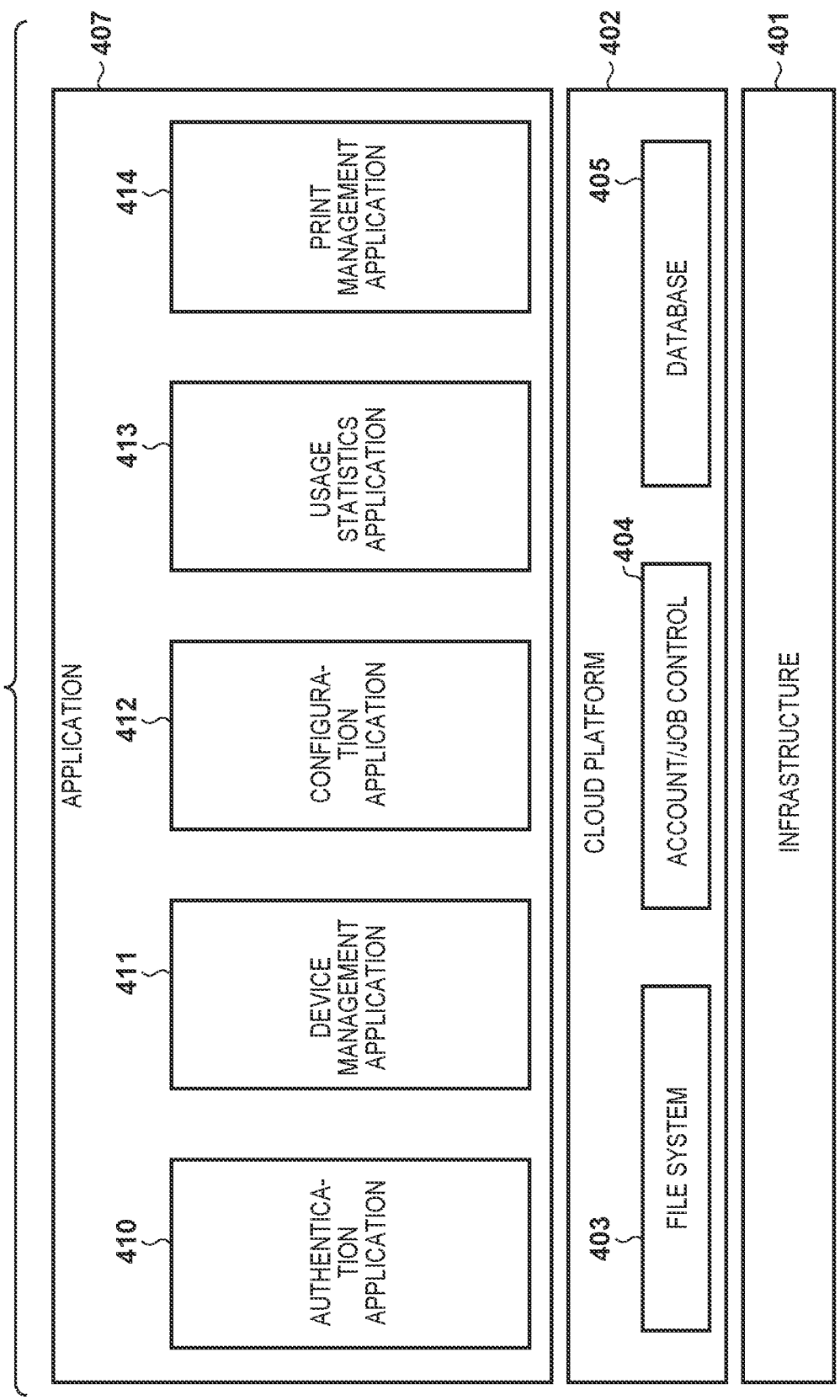
FIG. 4 is a block diagram illustrating a software configuration of a cloud server.

FIG. 4 is a block diagram illustrating the software configuration of the cloud server 130 according to the embodiment of the present invention, which is implemented in the cloud server 130.

An infrastructure 401 is a base for the cloud server to provide services, and includes a server, a virtual machine, a storage, a network, and an operating system.

A cloud platform 402 is a framework that provides common basic functions to applications 407 using the infrastructure 401, and includes a file system 403, an account/job control 404, and a database 405.

The application 407 communicates with a web browser running on the information processing device 102, and can display a menu on a web browser screen of the information processing device 102 and receive the input from the user. The application 407 is a software module that manages user accounts that can use the multifunction devices and printers, visualizes usage statistics of the multifunction devices and printers, and provides the users with various functions for using the multifunction devices.

The authentication application 410 is one of the applications 407 and uses the account/job control 404 that is the cloud platform 402 to manage users who can use the multifunction devices 113 and 123. The authentication application 410 receives the user information requested for authentication from the authentication print application 322 of the multifunction devices 113 and 123 via the network, and verifies the user name and password to perform user authentication. The user authentication may use an external authentication server such as Active Directory or LDAP instead of using the account/job control 404 that is the cloud platform 402.

The device management application 411 is one of the applications 407 and performs device management of the multifunction devices 113 and 123 to be connected and of registration, editing, and deletion of the multifunction device. Further, the device management application 411 also manages the private device that is the multifunction device associated with the user. In addition, the device management application 411 has a function of receiving the device registration request from the application operating on the multifunction device 113 or the like and registering the multifunction device 113 or the like on the cloud service.

A configuration application 412 provides a user interface to, for example, a terminal (not shown) via the web browser or the like, and sets the cloud server 130 itself, a system or the like operating in the cloud server 130 through the user interface.

A usage statistics application 413 is one of the applications 407, and manages statistical information on usage results of functions such as printing and scanning. The statistical information is collected by receiving the statistical information from a function of the authentication print application 322 of the multifunction device. Further, the statistical information is displayed on the web browser screen of the PC for each multifunction device registered by the device management application 411 or for each user registered by the authentication application 410.

The print management application 414 is one of the applications 407 and manages remote print jobs. The print management application 414 holds print job information transmitted from the PC. Then, upon receiving an inquiry about the print job information associated with the authenticated user from the authentication print application 322 of the multifunction device, the print management application 414 returns list information of print jobs associated with the user and print job information. This provides the remote printing function that allows printing to be performed from any multifunction device connected to the cloud server 130 regardless of which PC transmitted the print job.

Description of Device Registration Application Screen of Multifunction Device

Figure 5A:
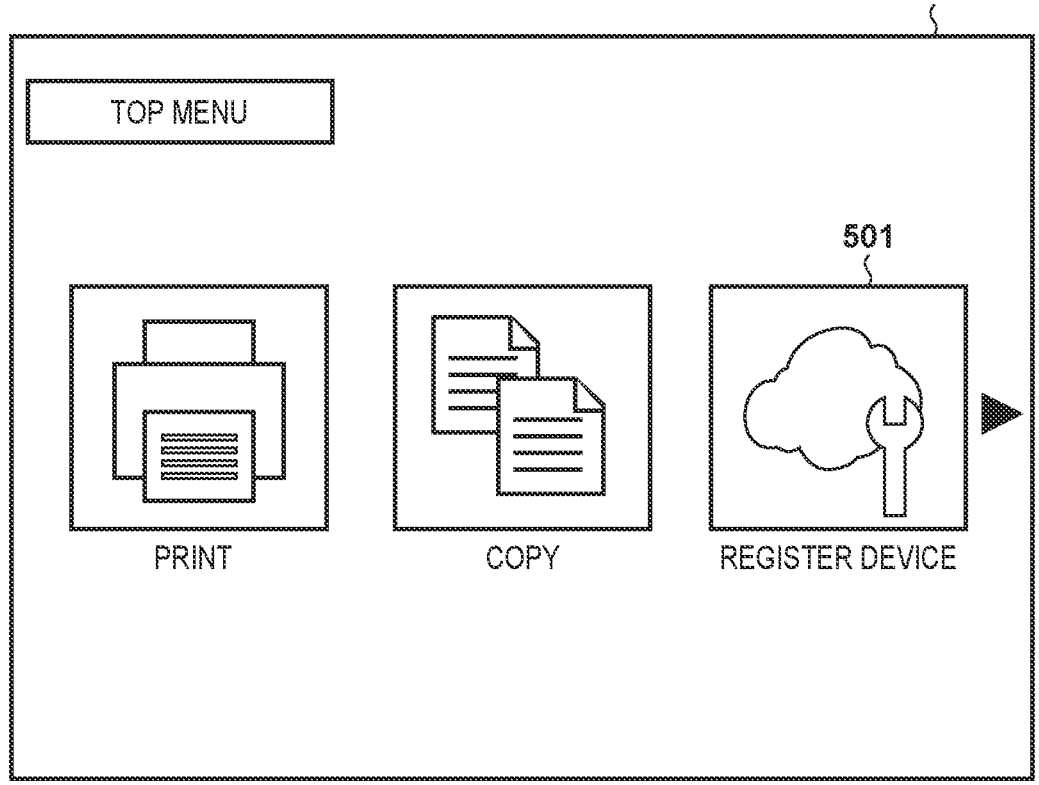
FIG. 5A is a diagram illustrating an example of a screen displayed on an operation unit by application of the multifunction device.

FIG. 5A is a diagram illustrating an example of a top menu screen in the multifunction device 113. The top menu screen is displayed on the operation unit 206 of the multifunction device 113. When the user starts using the multifunction device 113, a top menu 500 is displayed, and the user can select an application to be used on the multifunction device 113 from the top menu 500. Upon receiving selection of a device registration application icon 501 on the top menu 500, the device registration application 321 is activated. Note that it is sufficient to perform this device registration operation when using a device that is not managed by the device management application 411 for the first time. However, the top menu 500 including the device registration application icon 501 may be displayed, for example, as an initial screen after the multifunction device 113 is activated.

Figure 5B:
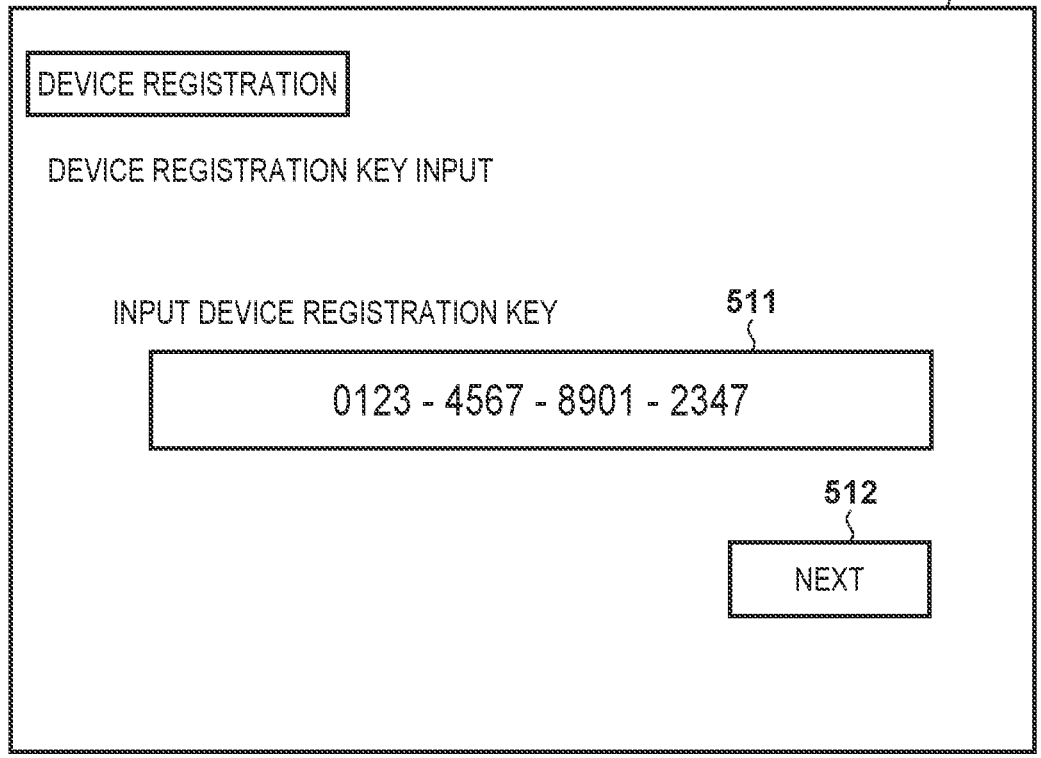
FIG. 5B is a diagram illustrating an example of the screen displayed on the operation unit by the application of the multifunction device.

FIGS. 5B and 5C are examples of device registration screens in the multifunction device 113. These screens are displayed on the operation unit 206 by the device registration application 321 executed by the CPU 201 of the multifunction device 113.

FIG. 5B is a diagram illustrating an example of a device registration key input screen 510 of the device registration application 321 displayed by pressing (or touching) the device registration application icon 501. The device registration key input screen 510 receives an input of the device registration key. The user inputs the device registration key obtained in advance from a cloud service management/setting screen, which will be described later with reference to FIG. 6, in an input field 511 via an input device 205. When the device registration application 321 determines that the input device registration key is valid, it enables "Next" button 512. Validity may be determined by, for example, a key input with a predetermined number of digits, or may also be determined by verifying the presence or absence of an erroneous input using an erroneous input detection algorithm such as the Luhn algorithm, and if no erroneous input is detected, in addition to the key input with a predetermined number of digits. Subsequently, when an input of the "Next" button 512 is received, the device registration information including the IP address of the multifunction device 113 and the input device registration key is transmitted to the device management application 411. In this way, device registration is requested to the device management application 411 of the cloud server 130. When receiving an out-of-location registration available notification from the device management application 411 as a response to the device registration request, a private device registration screen 520 is displayed.

FIG. 5C is a diagram illustrating an example of the private device registration screen 520 of the device registration application 321. The private device registration screen 520 receives an input of the user authentication information such as a PIN code and an input of "Next" button 523. Then, by transmitting the user authentication information, the device registration application 321 requests the device management application 411 to register the private device associated with the user corresponding to the user authentication information. Private device registration means that the multifunction device 113 is registered with the cloud service in association with the user. On the other hand, upon receiving an input from a shared device registration button 522, the device registration application 321 requests the device management application 411 to register the shared device. Shared device registration means that the multifunction device 113 is registered with the cloud service in association with the tenant. Note that although the PIN code is used as the user authentication information, the user may be authenticated by other means such as IC card authentication. Any information can be used as long as the information can uniquely identify the user, and it is desirable that the information can be known (or can be possessed) only by the user in order to further prevent spoofing and the like.

Description of Device Management Screen of Cloud Server

FIGS. 6A to 6D are examples of various function/setting screens provided by the cloud server 130 according to the embodiment. This screen is a display screen generated by each application 407 of the cloud server 130, and functions are provided. This screen is displayed on the web browser of the PC through communication with the cloud server 130 by the web browser running on the PC (not illustrated). A screen of FIG. 6A may be displayed when a user belonging to a specific tenant is authenticated by inputting the user authentication information or the like that can identify the tenant. Therefore, what is displayed in FIGS. 6A to 6D may be information about the tenant to which the authenticated user belongs, for example, information of devices belonging to that tenant, users, locations, or the like.

Figure 6A:
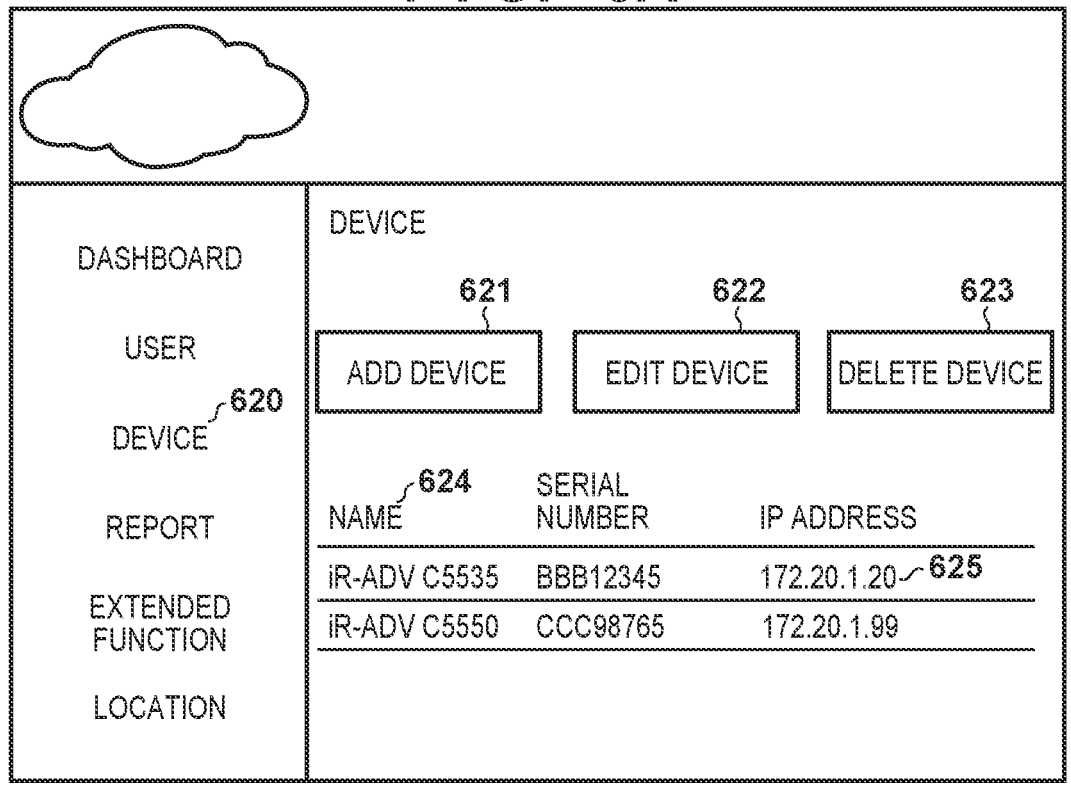
FIG. 6A is a diagram illustrating an example of a screen displayed on a browser by configuration application of the cloud server.

FIG. 6A is a device management display screen of the device management application 411, which is displayed by clicking a device tab 620. A device list 624 displays a list of multifunction devices that provide functions of the cloud server 130. An add button 621 is a button touched when adding a device, an edit button 622 is a button touched when editing a device, and a delete button 623 is a button touched when deleting a device. The user presses "Add device" button 621 to add the multifunction device or the printer that provides functions on the cloud server 130, and presses "Delete device" button 623 to delete it. When the user edits registered device information, the user presses "Edit device" button 622.

The cloud server 130 provides a group of registered devices with functions such as authentication of available users, statistics and visualization of print/scan usage records in each device, and remote printing. As an example, device information 625 indicates that a name of the multifunction device is "iR-ADV C5535", a unique serial number for each multifunction device is "BBB12345", and the IP address is "172.20.1.20". Note that information of the multifunction device (private device) associated with the user is not displayed here. In addition, the location of each device managed in association with the IP address may be displayed.

Figure 6B:
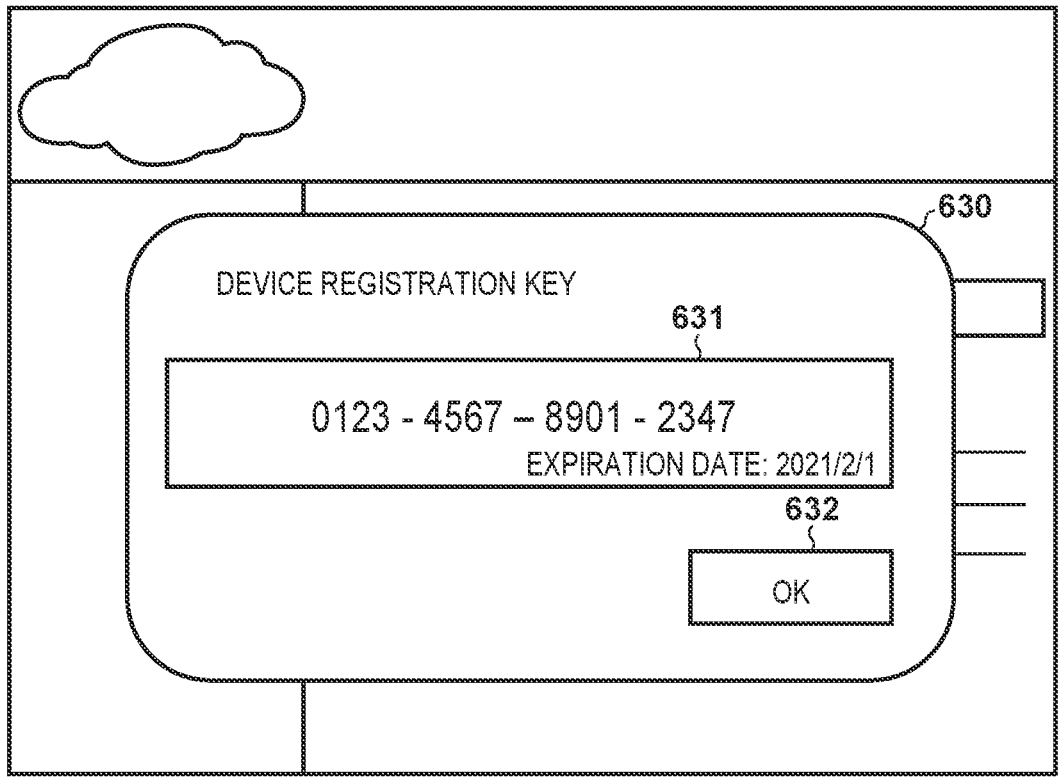
FIG. 6B is a diagram illustrating an example of the screen displayed on the browser by the configuration application of the cloud server.

FIG. 6B is a screen example in which a device registration key dialog 630 is displayed on the device management display screen by clicking the "Add device" button 621. A device registration key display area 631 displays the device registration key and an expiration date of the device registration key. The device registration key is key information used when registering a device, and includes, for example, information for identifying a tenant to which a logged-in user belongs. The device registration key is generated by the cloud server 130, for example, in response to the client clicking the "Add device" button 621, that is, a device addition request. By clicking "OK" button 632, display of the device registration key dialog 630 is ended, and the device management display screen as illustrated in FIG. 6A is returned. Since registration of an added device is performed in a procedure described later, the device registration key necessary for the registration is issued here. The issued device registration key is notified to the user on a screen of FIG. 6B and saved in the cloud server 130. The stored device registration key may be deleted once the device has been registered using it.

Figure 6C:
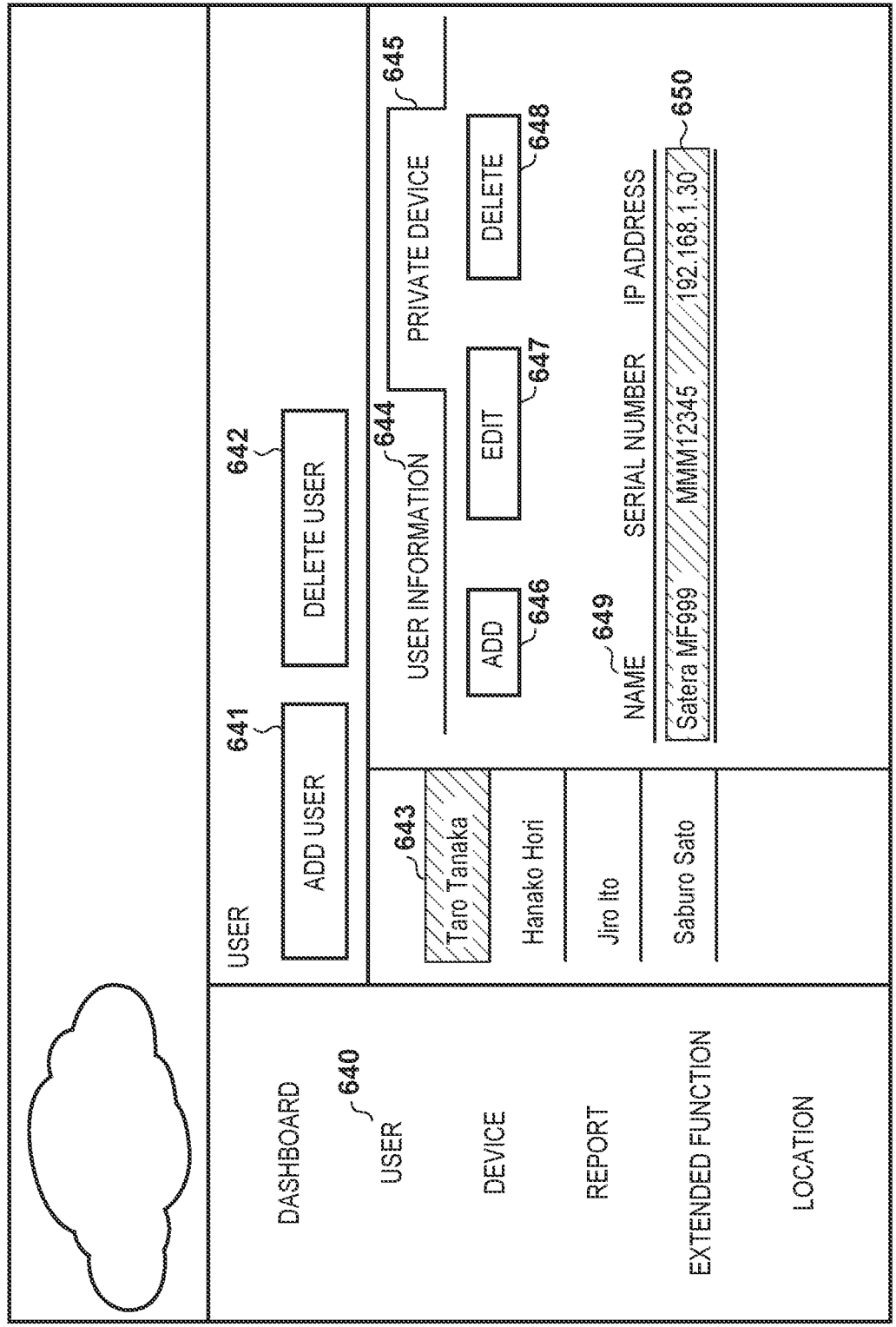
FIG. 6C is a diagram illustrating an example of the screen displayed on the browser by the configuration application of the cloud server.

Description of Cloud Server User Management and Private Device Management Screen FIG. 6C is a user management display screen displayed by clicking a user tab 640. A user list 643 displays a list of users registered in the cloud server 130. An add button 641 is a button touched when adding a user, and a delete button 642 is a button touched when deleting a user. When registering a user in the cloud server 130, the user presses "Add user" button 641, and when deleting the registered user, the user presses "Delete user" button 642. When editing or referring to the registered user information, the user presses the corresponding user from the user list 643.

After selecting the user, when a private device tab 645 is clicked, a list of multifunction devices associated with the user is displayed like a device list 649. The user presses "Add" button 646 to add a new multifunction device, "Edit" button 647 to edit a registered multifunction device, and "Delete" button 648 to delete a registered multifunction device.

Example of Location Management Screen of Cloud Server

FIG. 6D is a location management display screen displayed by clicking (or touching or pressing) a location tab 660. A location list 663 displays a list of location information registered in the cloud server 130. An add button 661 is a button touched when adding a location, and a delete button 662 is a button touched when deleting a location. The user presses "Add location" button 661 when registering location information in the cloud server 130, and presses "Delete location" button 662 when deleting a registered location information.

If the user edits or refers to the registered location information, the user presses the corresponding location from the location list 663.

After selecting the location, clicking "IP address range" tab 665 displays an IP address range list 669 associated with the location. The user presses "Add" button 666 when adding a new IP address range, presses "Edit" button 667 when editing a registered IP address range, and presses "Delete" button 668 when deleting a registered IP address range. As an example, the IP address range list 669 indicates that an IP address range associated with a location "Head office A" is from "172.20.0.0" to "172.20.255.255". This indicates, for example, that the multifunction device (with the IP address of 172.20.1.20) shown in the device information 625 described above belongs to the location "Head office A". Note that although the IP address range of the location is set here, it is not limited to the IP address and may be another address. Further, the IP address range is not limited to a section of continuous IP addresses, may be set by a plurality of discrete address groups, or may be set to include a section and an address group.

Information related to users, devices, and locations displayed on a UI illustrated in FIGS. 6A to 6D, or information that has been input is all stored and managed in the device management application 411 or the database 405 of the cloud server 130. Therefore, operations such as addition, deletion, and editing of information described with reference to FIGS. 6A to 6D are all reflected in the stored information.

Description of Network Configuration Example

Figure 7:
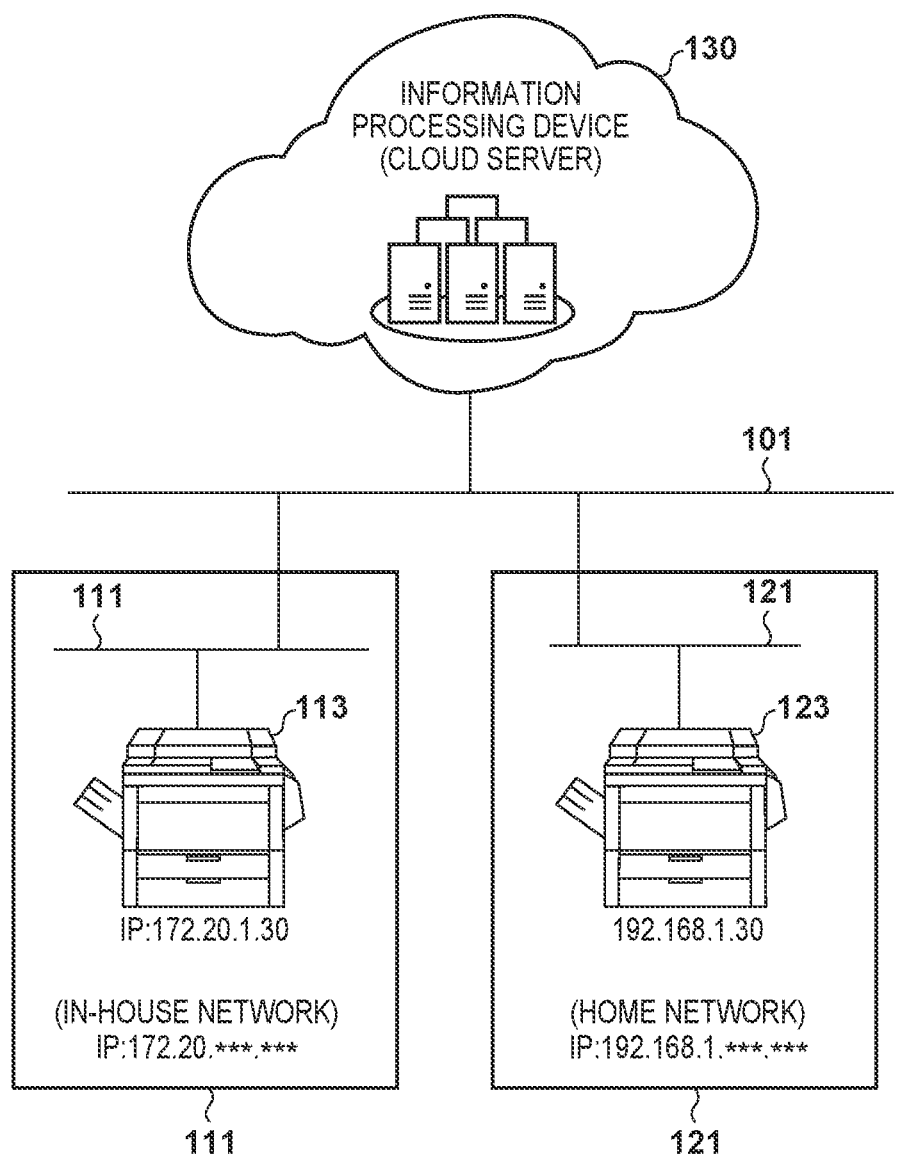
FIG. 7 is a diagram illustrating an example of the network configuration of the device management system.

FIG. 7 is an example of the network configuration according to the embodiment. FIG. 7 illustrates the network configuration illustrated in FIG. 1. Here, as an example, the network 111 is described as a company network, and the network 121 is described as a home network. A network address of the network 111 is 172.20.*.*, and a network address of network 121 is 192.168.1.***.

The multifunction device 113 assigned an IP address of 172.20.1.30 is connected to the network 111. The multifunction device 113 can communicate with the cloud server 130 via the network 111.

The multifunction device 123 assigned an IP address of 192.168.1.30 is connected to the network 121. The multifunction device 123 can communicate with the cloud server 130 via the network 101. A device registration processing procedure, which will be described later, enables the multifunction device 123 to be registered with the cloud server 130 like a private device 650 illustrated in FIG. 6C.

Device Registration Processing Procedure

FIG. 8 is a sequence diagram illustrating an example of device registration processing by the device registration application 321 and the device management application 411 according to the present embodiment. Here, processing after the user presses the icon 501 of the device registration application 321 displayed on the operation unit 206 and the device registration key input screen 510 is displayed is illustrated. The procedure of FIG. 8 is executed by the CPU (or a processor) of the multifunction device in a case of processing of the multifunction device, and by a CPU (or a processor) of the cloud server in a case of the cloud service. However, in the following description, it is assumed that a software module implemented by the CPU is a main module.

First, the processing procedure in the multifunction device 113 connected to the company network will be described, and then the processing procedure in the multifunction device 123 connected to the home network will be described.

First, in step S801, the device registration application 321 of the multifunction device receives the input of the device registration key 501. Upon receiving the device registration key input to the input field 511 from the user via the input device 205 and subsequently receiving the input of the "Next" button 512, the process proceeds to step S802. Note that it is assumed that the device registration key is notified in advance to the user who registers the device.

In step S802, the device registration application 321 transmits the device registration information including the IP address of the multifunction device and the input device registration key to the device management application 411 of the cloud server 130 to request device registration. The multifunction device may be either the multifunction device 113 or the multifunction device 123. The device registration information may include a device name, serial number, or the like in addition to the device registration key and the IP address. Note that if the received device registration key is not a valid device registration key, an error may be returned to the multifunction device at this point. The valid device registration key is a device registration key that has been issued by the UI in FIG. 6B and that is not used for device registration. If a device registration key that has been used for device registration is deleted from device registration keys that are stored as issued, the valid device registration key may be a device registration key that is stored as issued.

In step S803, the device management application 411 that has received the device registration request from the device registration application 321 determines to which tenant a connection is to be made from the device registration key included in the received device registration information. Then, in step S804, it is determined whether the received IP address is included in the location information set for a destination tenant.

In a case of the multifunction device 113, the IP address is 172.20.1.30, which is determined to be included in the location information (in an example of FIG. 6D, it is determined to be within the IP address range of "Head office A"). In this case, the device management application 411 registers the multifunction device 113 as a shared device (step S810), notifies the device registration application 321 of device registration completion notification (step S811), and ends the process.

In a case of the multifunction device 123, the IP address is 192.168.1.30, which is determined not to be included in the location information (in the example of FIG. 6D, it is assumed that the IP address is outside the IP address range of "Head office A" and outside the IP address range of other set locations). In this case, the process proceeds to step S820.

In step S820, the device management application 411 notifies the device registration application 321 of the out-of-location registration available notification. The out-of-location registration available notification is a message that notifies the user that the device is not registered as a shared device but can be registered as a private device associated with the user.

In step S821, the device registration application 321 that has received the out-of-location registration available notification from the device management application 411 displays the private device registration screen 520 on the operation unit 206.

In step S822, the device registration application 321 receives the input of the user authentication information. Upon receiving the user authentication information such as the PIN code, which has been input to an input field 521 by the user via the input device 205, and subsequent input of the "Next" button 523, the process proceeds to step S823.

In step S823, the device registration application 321 transmits private device registration information including the input user authentication information to the device management application 411 to request private device registration. The private device registration information includes the input user authentication information.

In step S824, the device management application 411 that has received a private device registration request from the device registration application 321 performs user authentication using the received user authentication information and a function of the authentication application 410. If the authentication is successful, the multifunction device 123 is registered as the private device associated with the authenticated user in step S825. Then, in step S826, the device registration application 321 is notified of a private device registration completion notification, and the process ends.

Note that in processing of step S822, the input from the shared device registration button 522 may be received instead of authentication information. In that case, a shared device registration request requesting registration as a shared device is transmitted to the device management application 411, instead of the private device registration request in step S823. Then, the device management application 411 that has received the shared device registration request performs processing similar to that of step S810 to register the multifunction device 123 as the shared device.

According to this configuration, when the multifunction device is registered with the cloud service, if the IP address assigned to the multifunction device is outside a range of locations managed by the cloud service, the user authentication of the cloud service can be performed subsequently. In this way, the authenticated user can be associated with the multifunction device and registered. This can reduce burden on users who register and use private devices in the cloud service.

Note that it is sufficient that the device registration key is unique at least from a time when the device registration key is issued until a time when the device is registered using the device registration key. Therefore, for example, when the device management application 411 issues a device registration key using an unused value, the value is stored as being in use. Values in use are not used when issuing a new device registration key. Then, when the device registration is completed by the procedure of FIG. 8 using the device registration key that has been issued, the device registration key may be deleted from the values in use to be a reusable value. In this way, the device registration key that is a limited resource can be reused.

Processing when Device is Moved

So far, in the above-described embodiment, a configuration is described in which the burden on the user is reduced when registering the private device with the cloud service.

As described above, the multifunction machine is used in various ways. In some cases, the multifunction device that has been registered as the shared device in the cloud service so that it can be shared by a plurality of users in the office may be moved to a private home or the like for purposes such as telework. Conversely, there may be a case where the multifunction device that has been registered as the private device in the cloud service and used at the private home or the like is returned to the office for shared use. In such a case, there is a problem that it takes time and effort for the user to cancel the registration of the multifunction device once from the cloud service and then register it again as the private device or the shared device.

Therefore, a configuration will be described in which the private device and the shared device can be easily switched as necessary when the multifunction device that has been registered in the cloud service is connected to a different network.

FIG. 9 is a sequence diagram illustrating an example of device registration information update processing of the device registration application 321 and the device management application 411 according to another embodiment.

In step S901, when the device registration application 321 detects an IP address change, the process proceeds to step S902. This processing may be performed by periodically acquiring the IP address of the multifunction device on which the device registration application 321 operates, or when the device registration application 321 is started, the process may proceed to step S902 without any particular conditions.

In step S902, the device registration application 321 notifies the device management application 411 of address information including the IP address of the multifunction device.

In step S903, the device management application 411 that has received a notification of the address information updates the IP address information of the multifunction device and determines whether a location change has occurred. For example, if it is determined that the multifunction device having operated within the location, that is, within the network 111, has moved outside the location, that is, within the network 121, the process proceeds to step S920. Conversely, for example, if it is determined that the multifunction device that has been registered as a private device outside the location has moved into the location, the process proceeds to step S910. If it is determined that no location change has occurred, the process ends here.

In step S910, the device management application 411 re-registers as the shared device the multifunction device having registered as the private device. That is, the registration as the private device is deleted and the multifunction device is registered as the shared device. Then, in step 911, the device registration application 321 is notified of a device registration update notification, and the process ends.

In step S920, the device management application 411 notifies the device registration application 321 of the location change. Upon receiving this notification, the device registration application 321 displays the private device registration screen 520 on the operation unit 206, and receives input of authentication information from the user. Since processing from step S921 to step S924 is the same as processing from step S821 to step S824, description of the processing is omitted.

In step S925, the device management application 411 re-registers the multifunction device having been registered as the shared device as the private device associated with the user authenticated in processing of step S924. That is, the registration as the shared device is deleted and the multifunction device is registered as the private device. Then, in step S926, the device registration application 321 is notified of the private device registration completion notification, and the process ends.

According to the configuration described above, if the multifunction device that has been registered in the cloud service is connected to a different network and the location change has occurred, it is possible to easily switch the private device and shared device, and to contribute to reduction of burden on the user.

Modification

In the above-described embodiments, the IP address assigned to the multifunction device on each network (111 or 121), a so-called private IP has been used for description, but a global IP may be used instead the private IP. For example, the networks 111 and 121 are assigned unique global Ips as seen from the network 101. When the device management application 411 receives information including the IP address from the device registration application 321 in step S802 or step S902, the global IP can be obtained at the same time. Then, in processing of step S804 or S903, it may be configured to determine whether the address is within the range of location using the global IP.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-200394, filed Dec. 9, 2021 which is hereby incorporated by reference herein in its entirety.

What is claimed is:

1. A cloud server for performing device management, the cloud server comprising:
one or more memories that store instructions; and
one or more processors that execute the instructions to:
issue a device registration key that is information used for registering a first device to a tenant to which a user belongs, wherein the issued device registration key is notified to the user;
receive a registration request from the first device, wherein the registration request includes address information of the first device and the device registration key which has been input to the first device by the user;
determine a tenant corresponding to the device registration key included in the received registration request;
determine whether the address information included in the received registration request is included in an address group preset for the tenant corresponding to the device registration key;
based on the determination of whether the address information is included in the preset address group,
automatically register the first device as the shared device of the tenant corresponding to the device registration key included in the received registration request, in a case where it is determined that the address information is included in the preset address group, or
automatically transmit, to the first device, a notification that the first device can be registered as a private device of the user and that can cause the first device to display a private device registration screen, in a case where it is determined that the address information is not included in the preset address group;
receive a private device registration request from the first device, wherein the private device registration request includes user authentication information which has been input by the user via the private device registration screen displayed by the first device in response to the notification;
perform user authentication using the user authentication information included in the received private device registration request; and
in a case where the user authentication is successful, automatically register the first device as the private device of the user identified by the user authentication information included in the received private device registration request,
wherein the one or more processors execute the instructions further to:
determine, in response to receiving a changed address from the first device being registered as the private device, whether to re-register the first device as the shared device or the private device;

re-register the first device as the shared device, in a case where it is determined to re-register the first device that as the shared device;

transmit, to the first device, a re-registration notification that the first device is to be re-registered as the private device, in a case where it is determined to re-register the first device as the private device;

receive a private device re-registration request from the first device, wherein the private device re-registration request includes user authentication information which is input by the user via the screen of the first device displayed in response to the re-registration notification; and re-register, in response to receiving the private device re-registration request, the first device as the private device of the user identified by the user authentication information included in the received private device re-registration request.

2. The cloud server according to claim 1, wherein the device displays the screen for inputting the user authentication information in response to receiving the notification from the cloud server, and transmits the private device registration request to the cloud server after the user authentication information is input by the user via the displayed screen.

3. The cloud server according to claim 1, wherein the address information included in the registration request is an IP address of the device.

4. The cloud server according to claim 1, wherein the device registration key is issued when the cloud server receives a device addition request from a web browser of an information processing apparatus after the user logs-in to the tenant via the web browser.

5. The cloud server according to claim 1, wherein
the one or more processors execute the instructions further to:
notify device registration completion notification to the first device if the first device is registered as the shared device of the tenant; and
notify private device registration completion notification to the first device if the first device is registered as the private device of the user.

6. A non-transitory computer-readable storage medium storing a computer program which, when loaded into a computer and executed, causes the computer to perform a device management method, the method comprising:

issuing a device registration key that is information used for registering a first device to a tenant to which a user belongs, wherein the issued device registration key is notified to the user;

receiving a registration request from the first device, wherein the registration request includes address information of the first device and the device registration key which has been input to the first device by the user;

determining a tenant corresponding to the device registration key included in the received registration request;

determining whether the address information included in the received registration request is included in an address group preset for the tenant corresponding to the device registration key;

based on the determination of whether the address information is included in the preset address group,
automatically registering the first device as the shared device of the tenant corresponding to the device registration key included in the received registration request, in a case where it is determined that the address information is included in the preset address group, or,
automatically transmitting, to the first device, a notification that the first device can be registered as a private device of the user and that can cause the first device to display a private device registration screen, in a case where it is determined that the address information is not included in the present address group;

receiving a private device registration request from the first device, wherein the private device registration request includes user authentication information which has been input by the user via the private device registration screen displayed by the first device in response to the notification;

performing user authentication using the user authentication information included in the received private device registration request;

in a case where the user authentication is successful, automatically registering first device as the private device of the user identified by the user authentication information included in the received private device registration request;

determining, in response to receiving a changed address from the first device being registered as the private device, whether to re-register the first device as the shared device or the private device;

re-registering the first device as the shared device, in a case where it is determined to re-register the first device that as the shared device;

transmitting, to the first device, a re-registration notification that the first device is to be re-registered as the private device, in a case where it is determined to re-register the first device as the private device, receiving a private device re-registration request from the first device, wherein the private device re-registration request includes user authentication information which is input by the user via the screen of the first device displayed in response to the re-registration notification; and re-registering, in response to receiving the private device re-registration request, the first device as the private device of the user identified by the user authentication information included in the received private device re-registration request.

* * * * *